United States Patent [19]

Tadokoro et al.

[11] Patent Number: 4,470,394
[45] Date of Patent: Sep. 11, 1984

[54] SUPERCHARGER CONTROL MEANS FOR INTERNAL COMBUSTION ENGINE

[75] Inventors: Tomoo Tadokoro; Ikuo Matsuda; Haruo Okimoto, all of Hiroshima, Japan

[73] Assignee: Toyo Kogyo Co., Ltd., Hiroshima, Japan

[21] Appl. No.: 456,501

[22] Filed: Jan. 7, 1983

[30] Foreign Application Priority Data

Jan. 13, 1982 [JP] Japan .................................. 57-4419

[51] Int. Cl.$^3$ ............................................ F02B 29/00
[52] U.S. Cl. .................................... 123/432; 123/559
[58] Field of Search ................ 123/190 A, 90.15, 308, 123/432, 559, 564, 587; 60/611

[56] References Cited

U.S. PATENT DOCUMENTS

| 1,578,581 | 3/1926 | Casna | 123/190 A |
| 4,315,489 | 2/1982 | Tadokoro et al. | 123/213 |
| 4,426,985 | 1/1984 | Kanesaka | 60/611 |

FOREIGN PATENT DOCUMENTS

| 54-45088 | 4/1979 | Japan . | |
| 54-45086 | 4/1979 | Japan . | |
| 60623 | 5/1980 | Japan | 60/611 |
| 156225 | 12/1980 | Japan | 123/432 |
| 153817 | 12/1980 | Japan | 123/432 |
| 519 | 1/1981 | Japan | 123/432 |
| 18022 | 2/1981 | Japan | 123/432 |
| 85522 | 7/1981 | Japan | 123/559 |

Primary Examiner—Ira S. Lazarus
Assistant Examiner—R. S. Bailey
Attorney, Agent, or Firm—Fleit, Jacobson, Cohn & Price

[57] ABSTRACT

A supercharged internal combustion engine comprising a combustion chamber of which volume cyclically changes in response to a rotation of the engine to conduct engine operating strokes including an intake and compression strokes, an intake system for supplying intake gas to the combustion chamber. The intake system includes a main intake passage having one end connected with the combustion chamber to have the intake gas therein taken into the combustion chamber under a suction pressure prevailing in the combustion chamber, a main throttle valve provided in the main intake passage, an auxiliary intake passage having one end connected with the combustion chamber, a supercharger provided in the auxiliary intake passage for providing a supply of supercharging gas to the combustion chamber, an auxiliary throttle valve provided in the auxiliary intake passage downstream of the supercharger, a timing valve provided in the auxiliary intake passage downstream of the auxiliary throttle valve, a valve operating device for operating the timing valve in response to the rotation of the engine, an engine load sensor for detecting engine load, a valve timing control device for controlling opening timing of the timing valve so that the timing valve is opened at least in a beginning period of the compression stroke, the valve timing control device is so designed that the opening timing is advanced in response to a decrease in the engine load.

6 Claims, 7 Drawing Figures

F I G. 1
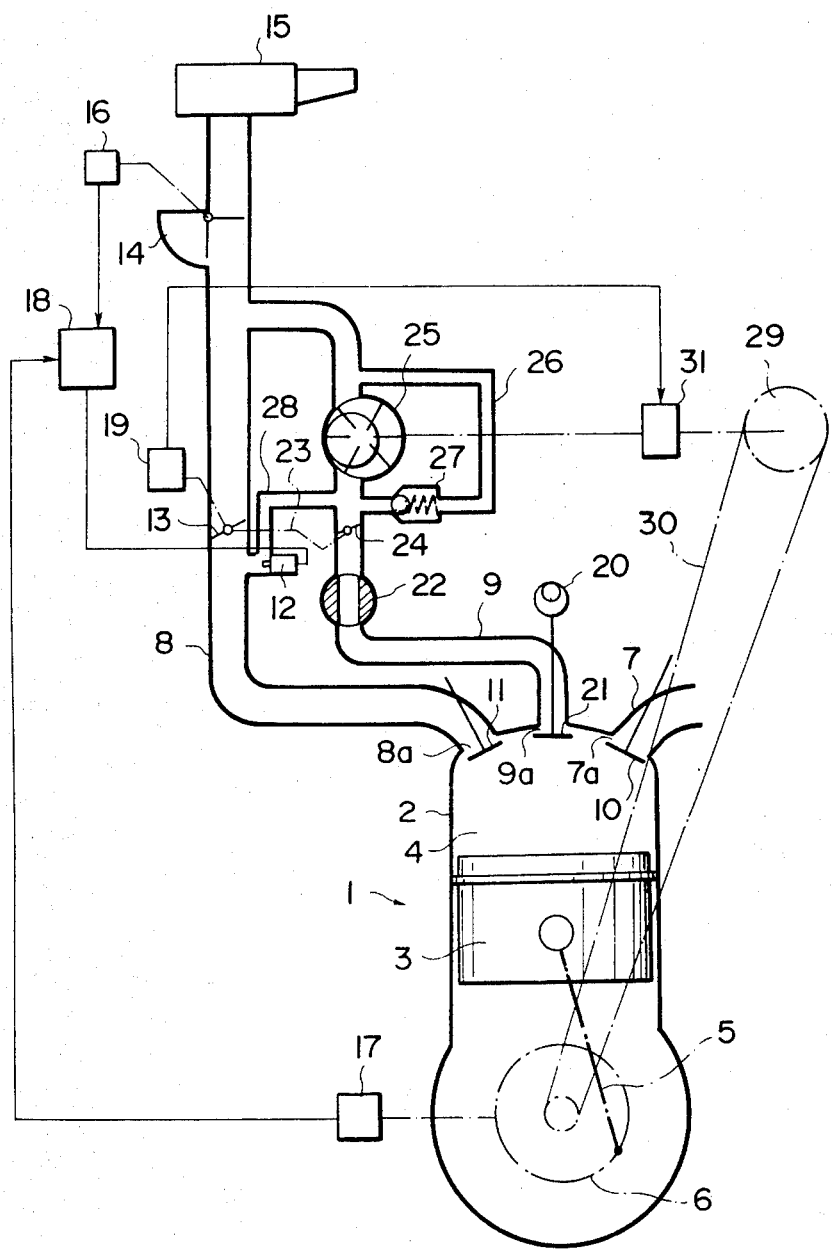

SUPERCHARGER CONTROL MEANS FOR INTERNAL COMBUSTION ENGINE

The present invention relates to an intake system for a supercharged internal combustion engine, and more praticularly to an intake system having a main intake passage and an auxiliary intake passage which is provided with a supercharger.

Conventional supercharged engines generally have an intake system provided with a turbo-supercharger which includes a compressor located in an intake passage and adapted to be driven by an exhaust gas turbine located in an exhaust passage. It has been experienced that, in this type of tubro-supercharger, a sufficient driving effort cannot be obtained in the exhaust gas turbine under a low speed engine operation resulting in an unsatisfactory supercharging effect and a poor engine response. Further, since the intake system is designed so that the intake air is totally passed through the supercharger to be compressed thereby, the temperature of the intake air is accordingly increased with the result that the density of the intake air is decreased and the effective charge of intake air is also decreased.

The problem of insufficient driving effort under a low engine speed operation can be solved by driving the supercharging compressor by the engine output shaft or by a motor. Further, in order to eliminate the latter mentioned problem, it has been proposed to provide, in parallel with the main intake passage, an auxiliary passage in which a supercharging compressor is located. This arrangement is found as advantageous in that a desired supercharging effect can be obtained with a relatively small supercharger. However, there still is a disadvantage in that the supercharged air may be blown back to the main intake passage when the supercharger is in operation. It has therefore been proposed by Japanese patent application No. 54-45086 filed on Apr. 12, 1979 and disclosed for public inspection on Oct. 27, 1980 under the disclosure No. 55-137314 to provide a timing valve in the auxiliary passage so that the passage is opened in an end period of the intake stroke and a beginning period of the compression stroke to thereby retard the supply of supercharging air. In order that the timing of the supercharging air supply be precisely controlled, it is recommended that the timing valve be provided downstream of the throttle valve which is located in the auxiliary passage. The Japanese patent application further proposes to control the timing valve in accordance with the engine speed so that the valve opening timing is advanced in response to an increase in the engine speed. A similar supercharging system applied to a rotary piston engine is disclosed by the U.S. Pat. No. 4,315,489 with corresponds to Japanese patent application No. 54-45087 filed on Apr. 12, 1979.

The supercharging system as disclosed by these Japanese patent applications has been found as having problems in that an increased air pressure prevails between the supercharger and the throttle valve under a light load engine operation wherein the throttle valve opening is small due at least in part to the fact that the timing of the supercharging air supply is retarded as described and therefore no significant pressure decrease will take place even when the timing valve is opened for supercharging. The increased air pressure in the auxiliary passage causes an increase in the load on the supercharger and as the result the engine load is accordingly increased particularly in case where the supercharger is driven by engine output shaft or by a motor.

It is therefore an object of the present invention to provide a supercharging control system which is effective to prevent an increase in the air pressure downstream of the supercharger under a light load engine operation.

Another object of the present invention is to provide an engine supercharging system in which the timing of supercharging air supply is controlled in accordance with the engine load.

A further object of the present invention is to provide an engine supercharging system by which fuel economy is accomplished.

According to the present invention, the above and other objects can be accomplished by a supercharged internal combustion engine comprising working chamber means of which volume cyclically changes in response to a rotation of the engine to conduct engine operating strokes including an intake and compression strokes, an intake system for supplying intake gas to said working chamber means, said intake system including main intake passage means having one end connected with said working chamber means to have the intake gas therein taken into the working chamber means under a suction pressure prevailing in the working chamber means, main throttle valve means provided in said main intake passage means, auxiliary intake passage means having one end connected with the working chamber means, supercharging means provided in said auxiliary intake passage means for providing a supply of supercharging gas to said working chamber means, auxiliary throttle valve means provided in said auxiliary intake passage means downstream of said supercharging means, timing valve means provided in said auxiliary intake passage means downstream of said auxiliary throttle valve means, valve operating means for operating said timing valve means in response to the rotation of the engine, engine load sensing means for detecting engine load, valve timing control means for controlling opening timing of the timing valve means so that the timing valve means is opened at least in a beginning period of the compression stroke, said valve timing control means including means for controlling the opening timing so that the opening timing is advanced in response to a decrease in the engine load.

According to the features of the present invention, the opening timing of the timing valve means is thus advanced in response to a decrease in the engine load. It is therefore possible to prevent a pressure increase downstream of the supercharger under a light load operation of the engine to thereby eliminate any increase in the load on the supercharger. The features of the present invention are particularly effective in a supercharging system in which the supercharger is driven by the engine or by a motor. The present invention can well be applied to a supercharging system in which the opening timing of the timing valve means is controlled in response to the engine speed as taught by the aforementioned Japanese patent applications.

In a preferable aspect of the present invention, the timing valve means comprises a rotary valve element disposed in said auxiliary intake passage means and having first opening means for passing the intake gas therethrough, and a sleeve fitted to said rotary valve element rotatably with respect to the rotary valve element and having second opening means for cooperation with said first opening means in the rotary valve element. The valve timing control means may then include means for determining rotational position of the sleeve. For example, a servomotor for rotating the sleeve and its control circuit may constitute the valve timing control means. The present invention can of course be applied not only to a reciprocating piston engine but also to a rotary piston engine.

The above and other objects and features of the present invention will become apparent from the following descriptions of preferred embodiments taking reference to the accompanying drawings, in which:

FIG. 1 is a diagrammatical illustration of an engine in accordance with one embodiment of the present invention;

Figure 2:
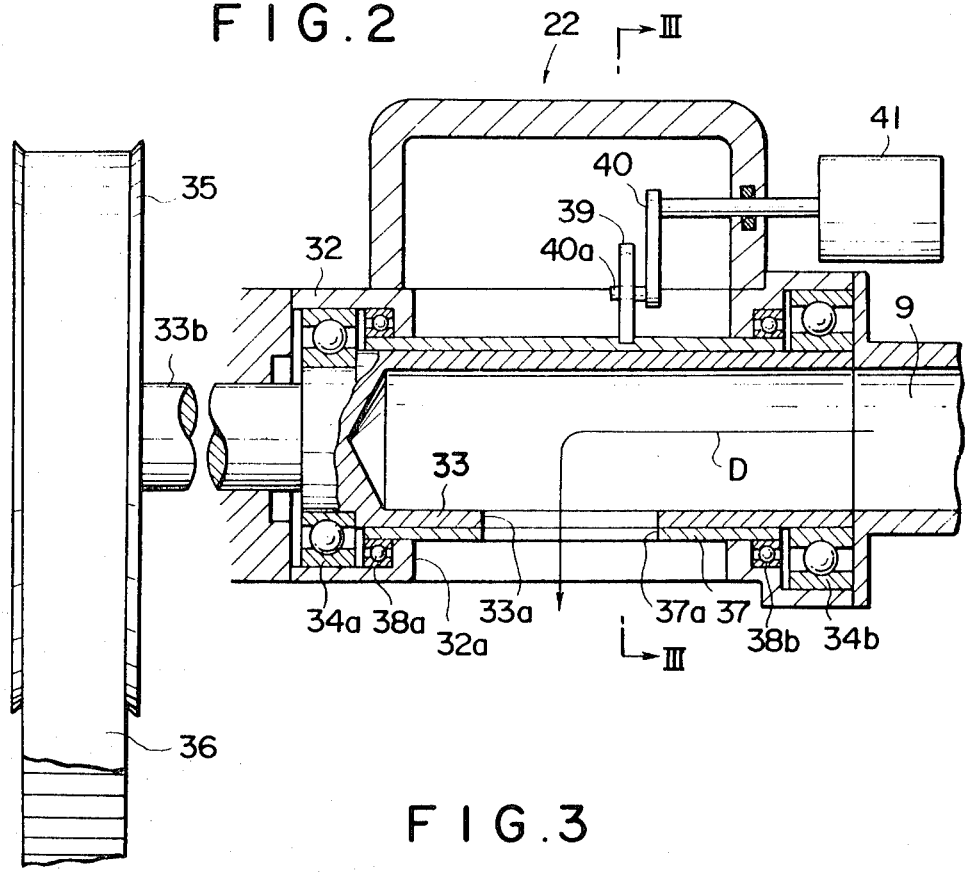
FIG. 2 is a sectional view of the timing valve used in the engine shown in FIG. 1.

Referring to the drawings, particularly to FIG. 1, there is shown an internal combustion engine 1 including a cylinder 2 and a piston 3 which is disposed in the cylinder 2 for reciprocating movements. The piston 3 defines in the cylinder 2 a working or combustion chamber 4 of which volume cyclically changes in response to reciprocating movements of the piston 3. The piston 3 is connected through a connecting rod 5 with a crankshaft 6 which defines an output shaft of the engine. The cylinder 2 is formed with an exhaust port 7a, a main intake port 8a and an auxiliary intake port 9a which are respectively associated with an exhaust valve 10, a main intake valve 11 and an auxiliary intake valve 21. The exhaust port 7a is connected with an exhaust passage 7 as conventional in the art.

The engine 1 has an intake system including a main intake passage 8 leading to the main intake port 8a. The main intake passage 8 is provided at the upstream end with an air cleaner 15. Further, an air-flow sensor 14 is provided in the main intake passage 8 downstream of the air cleaner 15. Between the air-flow sensor 14 and the main intake port 8a, there is a main throttle valve 13 which may be operated by a foot pedal provided in an automobile. Downstream of the main throttle valve 13, the main intake passage 8 is provided with a fuel injection nozzle 12. The air-flow sensor 14 is connected with a potentiometer 16 which produces an air flow signal represensing the air-flow through the main intake passage 8. On the crankshaft 6, there is provided an engine speed sensor 17 which produces an engine speed signal representing the rotating speed of the engine. The air-flow signal from the potentiometer 16 and the engine speed signal from the engine speed sensor 17 are applied to a fuel injection controller 18 which functions to calculate a desired amount of fuel to be supplied to the engine 1 under each operating condition of the engine and controls the fuel injection nozzle 12 in accordance with the result of the calculation. This type of fuel metering systems are well known in the art so that detailed descriptions will not be made.

The intake system further includes an auxiliary intake passage 9 which has a downstream end connected with the auxiliary intake port 9a and an upstream end connected with the main intake passage 8 between the airflow sensor 14 and the main throttle valve 13. The auxiliary intake passage 9 is provided with a vane type air pump 25 which constitute a supercharger. Downstream of the supercharger 25, there are provided an auxiliary throttle valve 24 and a timing valve assembly 22 which are arranged in this order in the direction of the intake air flow. The auxiliary throttle valve 24 is interconnected with the main throttle valve 13 through a suitable linkage 23 so that the former starts to open when the latter is opened to a predetermined position. The auxiliary intake passage 9 is further provided with a relief passage 26 which is in parallel with the supercharger 25 and has one end connected with the auxiliary intake passage 9 between the supercharger 25 and the auxiliary throttle valve 24. The other end of the relief passage 26 is opened to the passage 9 upstream of the supercharger 25. In the relief passage 26, there is provided a relief valve 27 which opens when the pressure downstream of the supercharger exceeds a predetermined value to relieve the pressure to the upstream of the supercharger 25. The fuel injection nozzle 12 is provided with an air bleed passage 28 which leads from the auxiliary intake passage 9 between the supercharger 25 and the auxiliary throttle valve 24 so that an air jet is applied to the fuel discharged from the nozzle 12 to thereby atomize the fuel.

Figure 6:
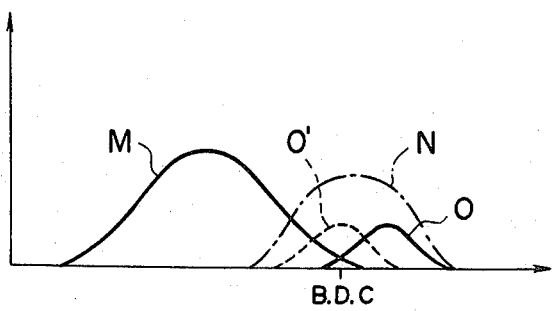
FIG. 6 is a diagram showing supercharging timing control in accordance with the present invention; and, FIG. 7 is a sectional view similar to FIG. 3 but showing another embodiment.

In the illustrated embodiment, the supercharger 25 is connected through an electromagnetic clutch 31 with a pulley 29 which in turn connected through a belt 30 with the engine crankshaft 6. An engine load sensor 19 is provided to detect the engine load in terms of the opening of the main throttle valve 13. The engine load sensor 19 produces an output when the engine load increases beyond a predetermined value to engage the clutch 31 to thereby drive the supercharger 25. The main intake valve 11 is controlled by a suitable cam (not shown) so that it is opened in the period shown by a curve M in FIG. 6. The auxiliary intake valve 21 is associated with a control cam 20 so that it is opened in the period as shown by a curve N in FIG. 6.

Figure 3:
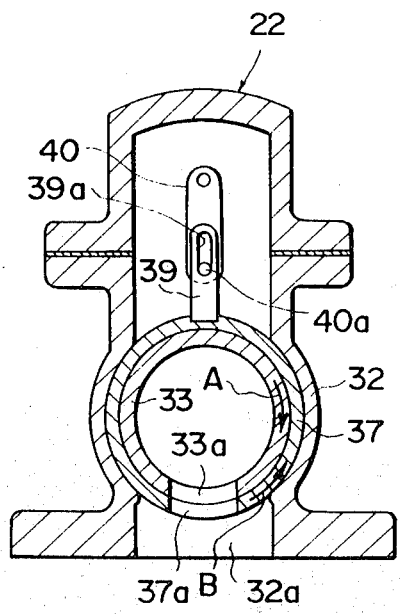
FIG. 3 is a sectional view taken substantially along the line III—III in FIG. 2.

Referring now to FIGS. 2 and 3, it will be noted that the timing valve assembly 22 includes a casing 32 which is located in the auxiliary intake passage 9. The casing rotatably carries a cylindrical valve member 33 through bearings 34a and 34b. As shown in FIG. 2, the valve member 33 is hollow inside and opened at one end to be communicated with the auxiliary intake passage 9 upstream of the valve assembly 22. The valve member 33 has a peripheral wall formed with an opening 33a which is adapted to be communicated through an opening 32a in the casing 32 with the auxiliary intake passage 9 downstream of the valve assembly 22.

The casing 32 further carries a cylindrical sleeve 37 which is supported thereon for rotation by means of bearings 38a and 38b. The sleeve 37 is fitted around the valve member 33 has an opening 37a which is adapted to cooperate with the opening 33a in the valve member 33. The valve member 33 is formed at an end opposite the open end with a shaft 33b which has a pulley 35 fitted thereto. The pulley 35 is engaged with a timing belt 36 which is in turn engaged with the engine crankshaft 6 so that the valve member 33 is rotated in synchronism with the engine crankshaft 6 in the direction shown by an arrow A in FIG. 3. It will therefore be understood that the opening 33a in the valve member 33 is cyclically brought into communication with the opening 37a in the sleeve 37 to allow the intake air to flow as shown by an arrow D in FIG. 2. It will further be understood that the opening timing of the valve 22 is therefore controlled by rotating the sleeve 37.

In order to determine the rotating position of the sleeve 37, it is provided with a radially extending arm 39 having an elongated slot 39a. A second arm 40 having a pin 40a is supported by the casing 32 and the pin 40a is engaged with the slot 39a in the arm 39. The arm 40 is secured to an output shaft of a servomotor 41 so that, by operating the servomotor 41, the sleeve 37 is rotated to control the opening timing of the valve assembly 22. For example, by rotating the sleeve 37 in the direction shown by an arrow B the valve opening timing is advanced. With this mechanism, it is possible to open the auxiliary passage 9 in the period as shown by a curve O in FIG. 6 and this opening timing can be changed for example as shown by a curve O'.

Figure 4:
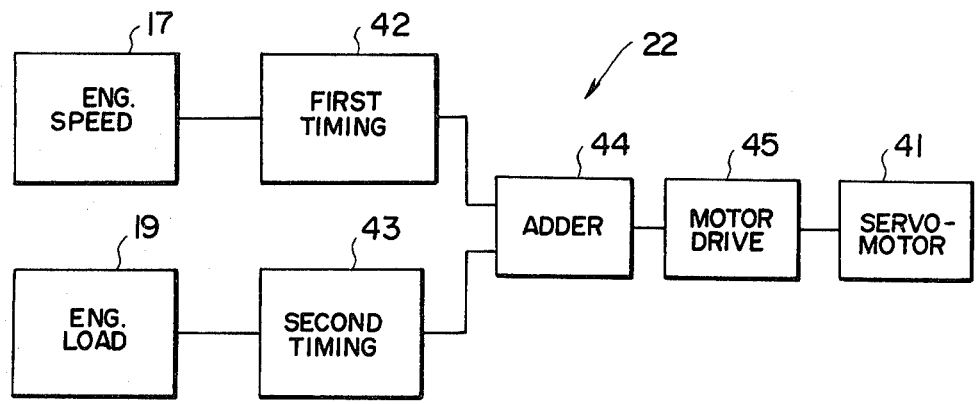
FIG. 4 is a block diagram showing a timing control circuit for controlling the timing valve.
Figure 5:
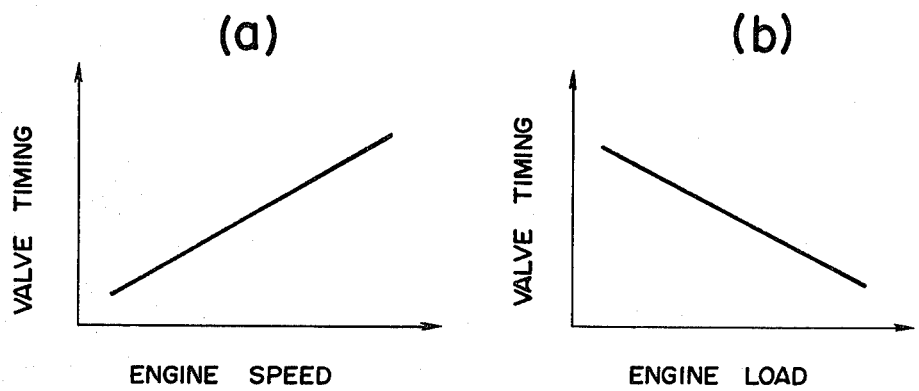
FIG. 5(a) is a diagram showing one example of valve timing control in accordance with the engine speed.
FIG. 5(b) is a diagram showing one example of valve timing control in accordance with the engine load.

FIG. 4 shows the control circuit for the servomotor 41. The control circuit includes a first timing circuit 42 which receives an engine speed signal from the engine speed sensor 17 and determines a desired valve opening timing in accordance with the engine speed as shown in FIG. 5(a). There is also provided a second timing circuit 43 which receives an engine load signal from the load sensor 19 to determine a desired valve opening timing in accordance with the engine load as shown in FIG. 5(b). The outputs of the circuits 42 and 43 are applied to an adding circuit 44 and the output from the circuit 44 is applied to a motor driving circuit 45 which produces an output for operating the servomotor 41 to thereby control the valve opening timing. It should be understood that the control circuit may be substituted by a properly programmed microprocessor.

In operation of the engine, when the engine load is low, the opening of the main throttle valve 13 is small so that the auxiliary throttle valve 24 is still closed. In this instance, the load sensor 19 does not produce an output and the clutch 31 is therefore disengaged. Thus, the intake gas is introduced only through the main intake passage 8 to the engine 1. Therefore, the surercharger 25 does not give any resistance to the intake gas flow nor incur any additional load to the engine 1.

As the main throttle valve 13 is opened beyond the aforementioned predetermined value, the auxiliary throttle valve 24 in the auxiliary intake passage 9 is opened and the clutch 31 is engaged under the signal from the engine load sensor 19. Thus, the supercharging air is supplied to the engine 1 cyclically as the timing valve assembly 22 opens. The opening timing of the valve assembly 22 is determined in accordance with the engine speed and the engine load as shown in FIGS. 5(a) and (b) by a current applied to the servomotor 41 from the motor driving circuit 45. More specifically, the valve opening timing is advanced in response to an increase in the engine speed and also in response to a decrease in the engine load. By thus advancing the valve opening timing under a light load engine operation, it is possible to decrease the pressure in the auxiliary intake passage 9 downstream of the auxiliary throttle valve 24 and therefore to prevent pressure increase between the supercharger 25 and the auxiliary throttle valve 24. It may be that, by advancing the valve opening timing in this way, there may be an increased possibility of producing blow back of supercharged air to the main intake passage under a light load engine operation. However, this is not harmful because such a loss in the supercharging pressure will not produce any serious problem in light load operation wherein a very high engine output is not required. Even if there is an increase in the intake gas temperature due to such blow back, there will be no danger of producing abnormal combustion such as knocking.

It is recommendable to advance the valve opening timing in response to an increase in the engine speed as described above because a sufficient intake charge can be provided for a high engine output without having a risk of producing a block back of supercharged air under a low speed operation.

Figure 7:
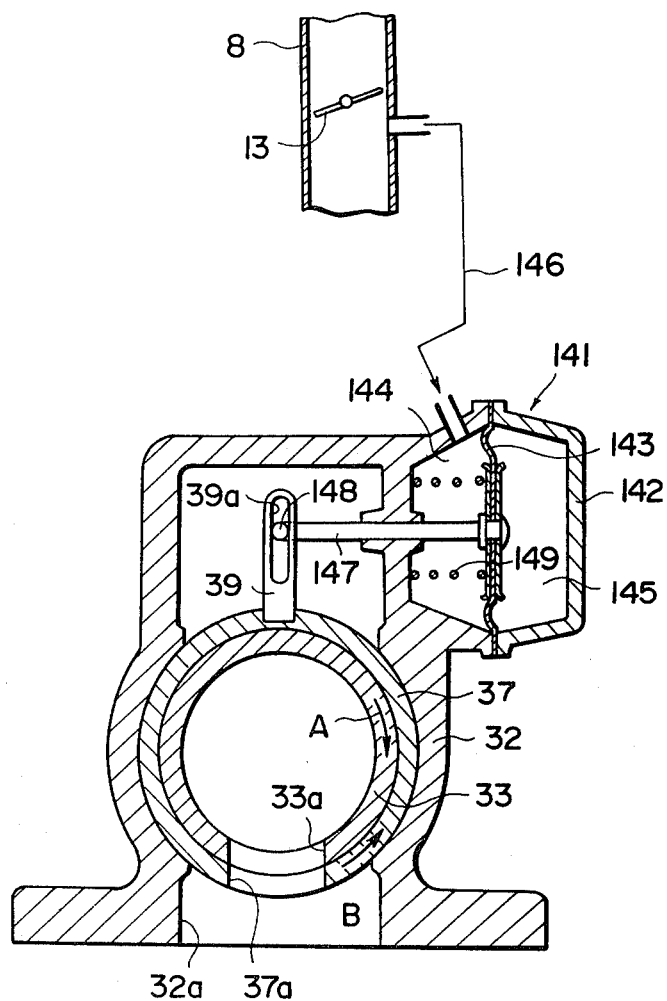

FIG. 7 shows another embodiment in which corresponding parts are designated by the same reference characters as in the previous embodiments. This embodiment has a suction pressure operated actuator 141 in the place of the servomotor 41 in the previous embodiment. The actuator 141 has a casing 142 and a diaphragm 143 which divides the inside of the casing 142 into a suction pressure chamber 144 and an atmospheric pressure chamber 145. The chamber 144 is connected through a suction pressure line 146 with the main intake passage downstream of the main throttle valve 13. The diaphragm 143 has an actuating rod 147 which is secured thereto and has a pin 148 engaged with the slot 39a in the arm 39 which is provided on the sleeve 37. In the chamber 144, there is a spring 149 which forces the diaphragm 143 rightwards to thereby rotate the sleeve clockwise to retard the valve opening timing. As the engine load is decreased, the suction pressure in the main intake passage is intensified so that the diaphragm 143 is moved leftwards to rotate the sleeve 37 counterclockwise. Therefore, the valve opening timing is advanced in response to a decrease in the engine load. In this embodiment, the valve opening timing is controlled only under the engine load to accomplish the object of the present invention.

The invention has thus been shown and described with reference to specific embodiments, however, it should be noted that the invention is in no way limited to the details of the illustrated structures but changes and modifications may be made without departing from the scope of the appended claims. For example, the timing valve may not necessarily be provided separately from the auxiliary intake valve but the auxiliary intake valve may be operated to function as the timing valve by suitably shaping the cam 20 as taught by the Japanese patent application No. 54-45086 corresponding to patent disclosure No. 55-137314. The engine load may be detected in terms of the opening of the auxiliary throttle valve. It should further be noted that the invention is not limited to an application to an engine driven supercharger but may be applied to a supercharger driven by an electric motor or to a turbo-supercharger.

We claim:

1. A supercharged internal combustion engine comprising working chamber means of which volume cyclically changes in response to a rotation of the engine to conduct engine operating strokes including an intake and compression strokes, an intake system for supplying intake gas to said working chamber means, said intake system including main intake passage means having one end connected with said working chamber means to have the intake gas therein taken into the working chamber means under a suction pressure prevailing in the working chamber means, main throttle valve means provided in said main intake passage means, auxiliary intake passage means having one end connected with the working chamber means, supercharging means provided in said auxiliary intake passage means for providing a supply of supercharging gas to said working chamber means, auxiliary throttle valve means provided in said auxiliary intake passage means downstream of said supercharging means, timing valve means provided in said auxiliary intake passage means downstream of said auxiliary throttle valve means, valve operating means for operating said timing valve means in response to the rotation of the engine, engine load sensing means for detecting engine load, valve timing control means for controlling opening timing of the timing valve means so that the timing valve means is opened at least in a beginning period of the compression stroke, said valve timing control means including means for controlling the opening timing so that the opening timing is advanced in response to a decrease in the engine load.

2. An engine in accordance with claim 1 in which said timing valve means comprises a rotary valve element disposed in said auxiliary intake passage means and having first opening means for passing the intake gas therethrough, and a sleeve fitted to said rotary valve element rotatably with respect to the rotary valve element and having second opening means for cooperation with said first opening means in the rotary valve element, said valve timing control means including means for determining rotational position of the sleeve.

3. An engine in accordance with claim 2 in which said valve timing control means includes a servomotor for rotating the sleeve and control circuit means for controlling the servomotor.

4. An engine in accordance with claim 2 in which said valve timing control means includes a suction pressure operated actuator for rotating the sleeve under a suction pressure in the main intake passage means downstream of said main throttle valve means.

5. An engine in accordance with claim 1 in which said engine load sensing means is means detecting position of said main throttle valve means, and the last mentioned means in said valve timing control means is means for controlling the opening timing in reverse proportion to the engine load.

6. An engine in accordance with claim 1 in which said valve timing control means further includes means for controlling the opening timing in accordance with engine speed so that the opening timing is advanced in response to an increase in the engine speed.

* * * * *